United States Patent
Higuchi et al.

(10) Patent No.: US 10,875,180 B2
(45) Date of Patent: Dec. 29, 2020

(54) ROBOT SYSTEM

(71) Applicant: OMRON Corporation, Kyoto (JP)

(72) Inventors: Toshiyuki Higuchi, Kusatsu (JP); Yoshiharu Tani, Kusatsu (JP); Kazunori Osako, Otsu (JP); Minoru Hashimoto, Ritto (JP); Daichi Kamisono, Kusatsu (JP); Masaki Fujita, Ritto (JP)

(73) Assignee: OMRON Corporation, Kyoto (JP)

( * ) Notice: Subject to any disclaimer, the term of this patent is extended or adjusted under 35 U.S.C. 154(b) by 475 days.

(21) Appl. No.: 15/893,680

(22) Filed: Feb. 11, 2018

(65) Prior Publication Data

US 2018/0333854 A1    Nov. 22, 2018

(30) Foreign Application Priority Data

May 16, 2017   (JP) ................. 2017-097577

(51) Int. Cl.
*H02H 11/00* (2006.01)
*B25J 9/16* (2006.01)

(52) U.S. Cl.
CPC ........... *B25J 9/1666* (2013.01); *B25J 9/1676* (2013.01); *B25J 9/1694* (2013.01); *B25J 9/1697* (2013.01); *G05B 2219/40199* (2013.01); *G05B 2219/40202* (2013.01); *G05B 2219/40559* (2013.01); *G05B 2219/43203* (2013.01); *Y10S 901/09* (2013.01); *Y10S 901/47* (2013.01)

(58) Field of Classification Search
CPC ...... B25J 9/1666; B25J 9/1676; B25J 9/1694; B25J 9/1697; B25J 9/1602; G05B 2219/40202; G05B 2219/43203; G05B 2219/40559; G05B 2219/40199; Y10S 901/47; Y10S 901/09

See application file for complete search history.

(56) References Cited

U.S. PATENT DOCUMENTS

| | | | | |
|---|---|---|---|---|
| 9,559,515 B2* | 1/2017 | Frangen | .................... | F16P 7/02 |
| 2009/0312868 A1* | 12/2009 | Tojo | ........................ | B25J 9/1676 |
| | | | | 700/245 |
| 2013/0343640 A1* | 12/2013 | Buehler | .................... | B25J 9/163 |
| | | | | 382/155 |
| 2016/0325432 A1* | 11/2016 | Tian | ........................ | B25J 19/023 |

FOREIGN PATENT DOCUMENTS

| | | |
|---|---|---|
| JP | 2009078324 | 4/2009 |
| JP | 2016196069 | 11/2016 |
| WO | 2012076029 | 6/2012 |
| WO | 2014102018 | 7/2014 |

OTHER PUBLICATIONS

"Search Report of Europe Counterpart Application", dated Oct. 5, 2018, p. 1-p. 7.

* cited by examiner

*Primary Examiner* — Masud Ahmed
(74) *Attorney, Agent, or Firm* — JCIPRNET

(57) ABSTRACT

Provided is a highly safe robot system. A robot system includes: an arm operation control unit that controls operations of an arm; and a storage unit that records hazardous part information related to at least any one of a grip unit of the arm and a work target gripped with the grip unit, and the arm operation control unit causes the arm to operate such that the hazardous direction of the hazardous part is different from a moving direction of the grip unit on the basis of the hazardous part information.

16 Claims, 7 Drawing Sheets

ROBOT SYSTEM

CROSS-REFERENCE TO RELATED APPLICATION

This application claims the priority benefits of Japanese application serial no. 2017-097577, filed on May 16, 2017. The entirety of the above-mentioned patent applications is hereby incorporated by reference herein and made a part of this specification.

BACKGROUND

Technical Field

The disclosure relates to a robot system that operates by a program.

Description of Related Art

A robot system in which an arm that can operate to perform work is provided is known as a technology in the related art. For such a robot system, a technique for suppressing injury to an operator due to collision of the arm with the operator when the operator performs work near the robot system during operations of the arm is also known. For example, Patent Document 1 (Japanese Laid-open No. No. 2016-196069, published on Nov. 24, 2016) discloses an avoidance track generation apparatus that generates an avoidance track in order for an operator not to collide with a protrusion when it is detected that the operator is approaching an industrial robot that has a protrusion. Patent Document 2 (Japanese Laid-open No. 2009-78324, published on Apr. 16, 2009) discloses an end effector that accommodates a claw member, which may be unfavorably brought into contact with an operator, in a cover portion.

However, the techniques in the related art as described above do not reliably prevent collision of the operator with the protrusion. For example, in Patent Document 1, although the collision of the operator with the protrusion is avoided by using the avoidance track, there is a problem that a calculation load is needed to generate the avoidance track and an avoidable range is limited. In addition, in Patent Document 2, although the claw member that has a protrusion is configured to be accommodated in the cover portion, there is a problem that the size of a work target (workpiece) that can be gripped with the claw member is restricted by the size of the cover portion.

SUMMARY

An object of an aspect of the invention is to provide a highly safe robot system capable of reliably preventing collision of an operator with a protrusion.

According to an embodiment of the present invention, a robot system according to an aspect of the invention includes: an arm operation control unit that controls operations of an arm; and a storage unit that records hazardous (dangerous) part information related to a position of a hazardous part and a hazardous direction of at least any one of a grip unit of the arm and a work target gripped with the grip unit, and the arm operation control unit causes the arm to operate such that the hazardous direction of the hazardous part is different from a moving direction of the grip unit on the basis of the hazardous part information.

BRIEF DESCRIPTION OF THE DRAWINGS

FIGS. 5A and 5B are schematic views illustrating a relation between a moving direction of the grip unit and an orientation of a hazardous part in a case in which the grip unit has the hazardous part in the robot system according to the first embodiment of the invention, wherein FIG. 5A illustrates a state before an arm is caused to operate, and FIG. 5B illustrates a state when the arm is caused to operate.

FIGS. 6A and 6B are schematic views illustrating a relation between a moving direction of the grip unit and an orientation of a hazardous part in a case in which a workpiece has the hazardous part in the robot system according to the first embodiment of the invention, wherein FIG. 6A illustrates a state before the arm is caused to operate, and FIG. 6B illustrates a state when the arm gripping the workpiece with the grip unit is caused to operate.

DESCRIPTION OF THE EMBODIMENTS

First Embodiment

A first embodiment of the invention will be described below with reference to FIGS. 1 to 6B.

Configuration of Robot System

Figure 1:
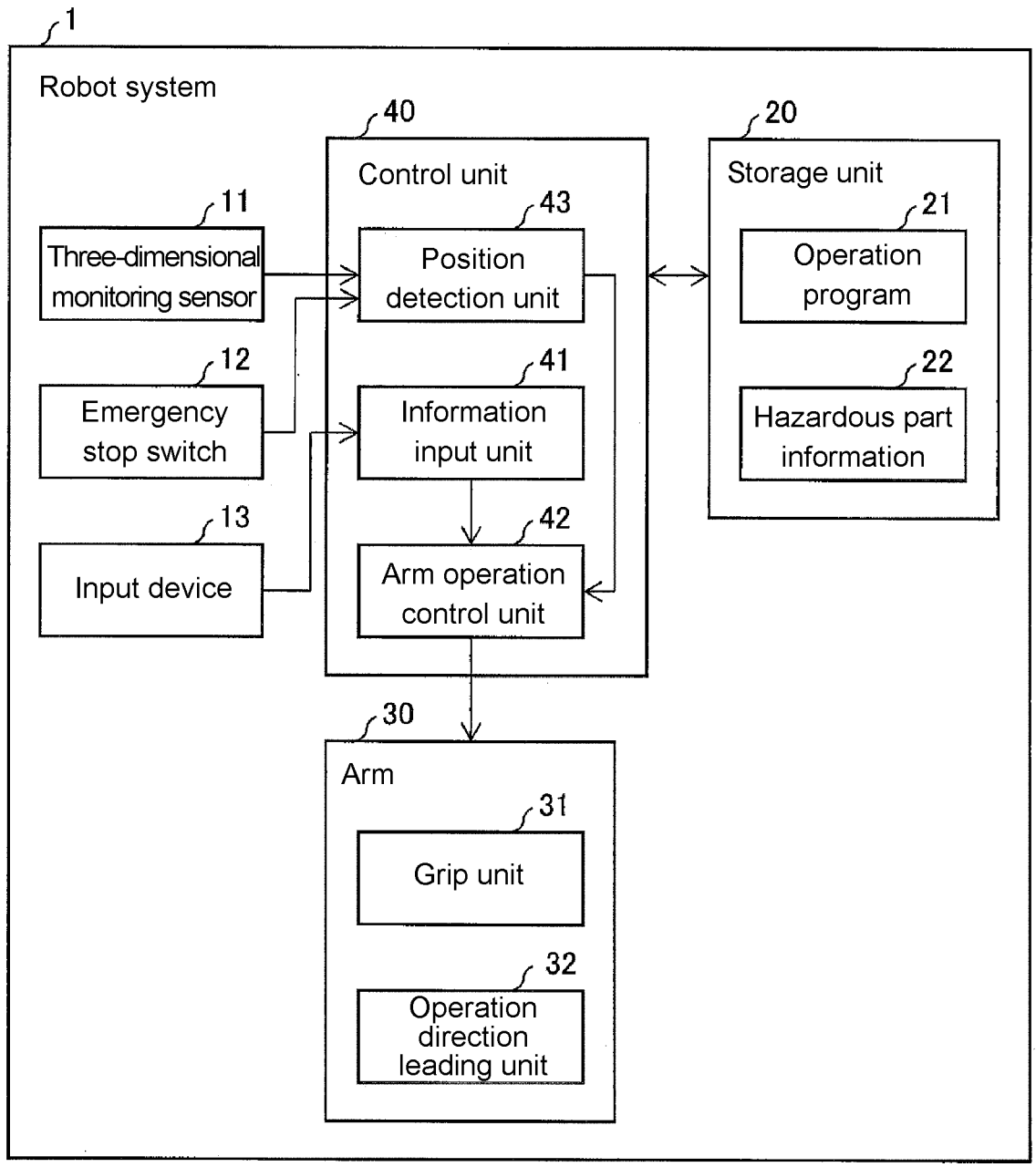
FIG. 1 is a block diagram illustrating an example of configurations of main components in a robot system according to a first embodiment of the invention.
Figure 2:
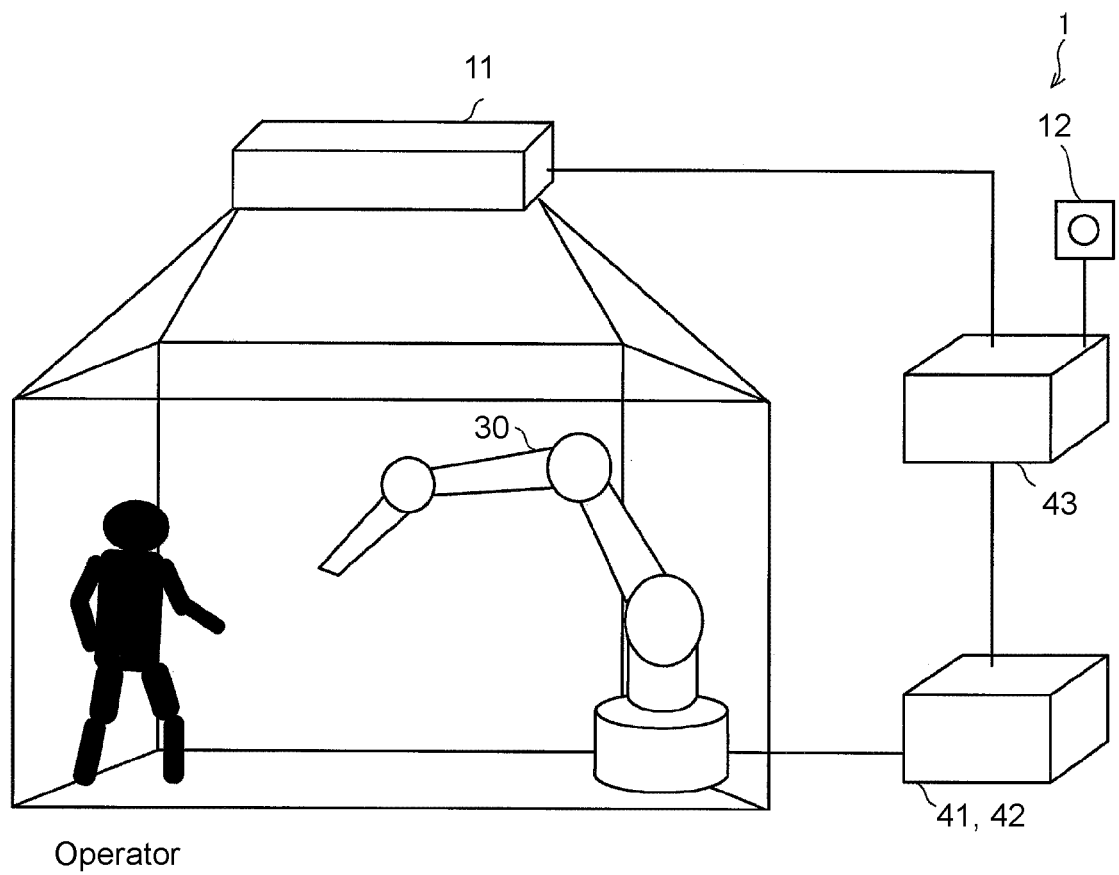
FIG. 2 is a schematic view illustrating an outline of the robot system according to the first embodiment of the invention.

An outline and a configuration of a robot system 1 according to an aspect of the invention will be described with reference to FIGS. 1 and 2. FIG. 1 is a block diagram illustrating an example of configurations of main components in the robot system 1. FIG. 2 is a schematic view illustrating an outline of the robot system 1.

First, the outline of the robot system 1 will be described with reference to FIG. 2. According to the example illustrated in the drawing, the robot system 1 can monitor a position of an operator with a three-dimensional monitoring sensor 11. The robot system 1 can perform work by causing an arm 30 supported by a platform to operate. The aforementioned processing is controlled by a control unit 40 that the robot system 1 has.

In addition, the robot system 1 can receive hazardous part information related to positions and a direction of a hazardous part by an information input unit 41 when the arm 30 and the work target (hereinafter referred to as a workpiece) have a hazardous part. Further, the robot system 1 can cause the arm 30 to operate such that the hazardous direction of the hazardous part is different from a moving direction of a grip unit of the arm 30 on the basis of the received hazardous part information. Here, the workpiece may have a shape with which the arm 30 can grip the workpiece by using the grip unit. Further, the hazardous part is a part that may injure the operator when the hazardous part collides with the operator, and for example, is a protrusion with a sharp tip end. The hazardous direction is a direction in which the operator may be injured when the hazardous part collides with the operator, and if the hazardous part is a protrusion, for example, the hazardous direction is a direction in which the protrusion is pressed against the operator. If the protrusion is pressed against the operator at this time, the operator is stabbed and injured.

Next, a configuration of the robot system 1 will be described with reference to FIG. 1. According to the example illustrated in the drawing, the robot system 1 includes a three-dimensional monitoring sensor 11, an emergency stop switch 12, an input device 13, a storage unit 20, the arm 30, and the control unit 40. In addition, the storage unit 20 includes an operation program 21 and hazardous part information 22, and the arm 30 includes a grip unit 31. Further, the control unit 40 includes an information input unit 41, an arm operation control unit 42, and a position detection unit 43. Note that, although an operation direction leading unit 32 is illustrated in FIG. 1 in addition to the aforementioned configurations, the operation direction leading unit 32 is not essential in the embodiment. Details of these members will be described later.

The robot system 1 can cause the respective components to operate in accordance with the operation program 21. More specifically, the robot system 1 can cause the arm 30 to operate in accordance with the operation program 21.

Furthermore, the control unit 40 may be connected for communication with higher-level devices such as a controller, for example, and change content of operations in the operation program 21 in response to instructions from the controller, though this is not illustrated in the drawing. In addition, an actual operation status of the arm 30, imaging data obtained by the three-dimensional monitoring sensor 11, and the like may be transmitted to the controller.

The three-dimensional monitoring sensor 11 is a sensor capable of detecting the position of the operator near the robot system 1. The three-dimensional monitoring sensor 11 may be a laser scanner that scans laser light in a predetermined range, for example, and detects presence of the operator depending on whether or not there is reflected light. The three-dimensional monitoring sensor 11 can transmit the detection result to the position detection unit 43.

The emergency stop switch 12 is a switch capable of stopping operations of the arm 30 in an emergency. The emergency stop switch 12 is arranged outside an operation range of the arm 30, for example, and may be arranged at a position at which another operator who has determined there is a possibility that the arm 30 may collide with the operator can easily press the emergency stop switch 12. If the emergency stop switch 12 is pressed, a notification is provided to the position detection unit 43. Furthermore, the emergency stop switch 12 may be connected to the arm operation control unit 42, and if the emergency stop switch 12 is pressed at this time, a notification is provided to the arm operation control unit 42.

The input device 13 is a device for a user to provide various inputs to the robot system 1. The user can input hazardous part information related to the position of the hazardous part and the hazardous direction of at least one of the grip unit 31 and the workpiece gripped with the grip unit 31 to the robot system 1 via the input device 13. The input device 13 may be a general personal computer, for example.

The storage unit 20 can retain various kinds of data to be handled by the robot system 1. In the example illustrated in the drawing, the storage unit 20 includes at least the operation program 21 and the hazardous part information 22.

The operation program 21 is a program in which processing necessary for operations of the robot system 1 is described. The operation program 21 is read by the control unit 40, and the control unit 40 can cause the respective components to operate in accordance with the content of the description in the operation program 21.

The hazardous part information 22 is information related to the position of the hazardous part and the hazardous direction of at least any one of the grip unit 31 and the workpiece gripped with the grip unit 31, which has been input by the user using the input device 13 and has been received by the information input unit 41. The hazardous part information 22 may include a shape and a position of a workpiece, and a relative position of hazardous parts that the workpiece has, for example.

The arm 30 is a part that the robot system 1 uses for operations. The arm 30 may be a flexible arm having a plurality of joints, for example. The arm 30 can operate in accordance with control performed by the arm operation control unit 42.

The grip unit 31 is provided at a tip end of the arm 30 and can operate in accordance with the control performed by the control unit 40. The grip unit 31 has a robot hand-shape, for example, and can grip the workpiece. Furthermore, the grip unit 31 may be configured to have a hazardous part or may be configured not to have a hazardous part.

The control unit 40 comprehensively controls the respective components of the robot system 1. The control unit 40 can receive the hazardous part information input from the input device 13 by the information input unit 41 and record the hazardous part information in the storage unit 20. The control unit 40 can provide instructions to the arm operation control unit 42 to cause the arm 30 to operate in the manner of the hazardous direction of the hazardous part is different from the moving direction of the grip unit 31 on the basis of the hazardous part information 22. Further, the control unit 40 can provide, on the basis of the hazardous part information, an instruction for switching the hazardous direction of the hazardous part under a state in which the grip unit 31 is not gripping the workpiece and a state in which the grip unit 31 is gripping the workpiece to the arm operation control unit 42.

In addition, if the position detection unit 43 receives the detection result obtained by the three-dimensional monitoring sensor 11, then the control unit 40 can determine whether the detected position of the operator is in the moving direction of the grip unit 31. If the position detection unit 43 receives the fact that the emergency stop switch 12 has been pressed, the control unit 40 can stop operations of the arm 30 via the arm operation control unit 42.

The information input unit 41 can receive the hazardous part information related to the position of the hazardous part and the hazardous direction of at least any one of the grip unit 31 and the workpiece gripped with the grip unit 31, which has been input by the user via the input device 13, and store the hazardous part information in the hazardous part information 22. Furthermore, the information input unit 41 may receive the hazardous part information from a communication network, which is not illustrated in the drawing, for example, and store the hazardous part information in the storage unit 20.

The arm operation control unit 42 can cause the arm 30 to operate in accordance with instructions from the control unit 40. The arm operation control unit 42 can cause the arm 30 to operate in a manner of the hazardous direction of the hazardous part is different from the moving direction of the grip unit 31 on the basis of the hazardous part information read from the hazardous part information 22. In addition, the arm operation control unit 42 can receive a result of detecting the operator by the position detection unit 43 and cause the arm 30 to operate in accordance with the detection result. When the position detection unit 43 detects the operator, the arm operation control unit 42 can cause the arm 30 to operate with operations that are different from those when the arm operation control unit 42 does not detect the operator, for example.

The position detection unit 43 can detect the position of the operator near the robot system 1. Specifically, the position detection unit 43 can detect the position of the operator near the robot system 1 by using the three-dimensional monitoring sensor 11 and transmit the detection result to the arm operation control unit 42.

Moving Direction of Grip Unit and Orientation of Hazardous Part

Figure 3A:
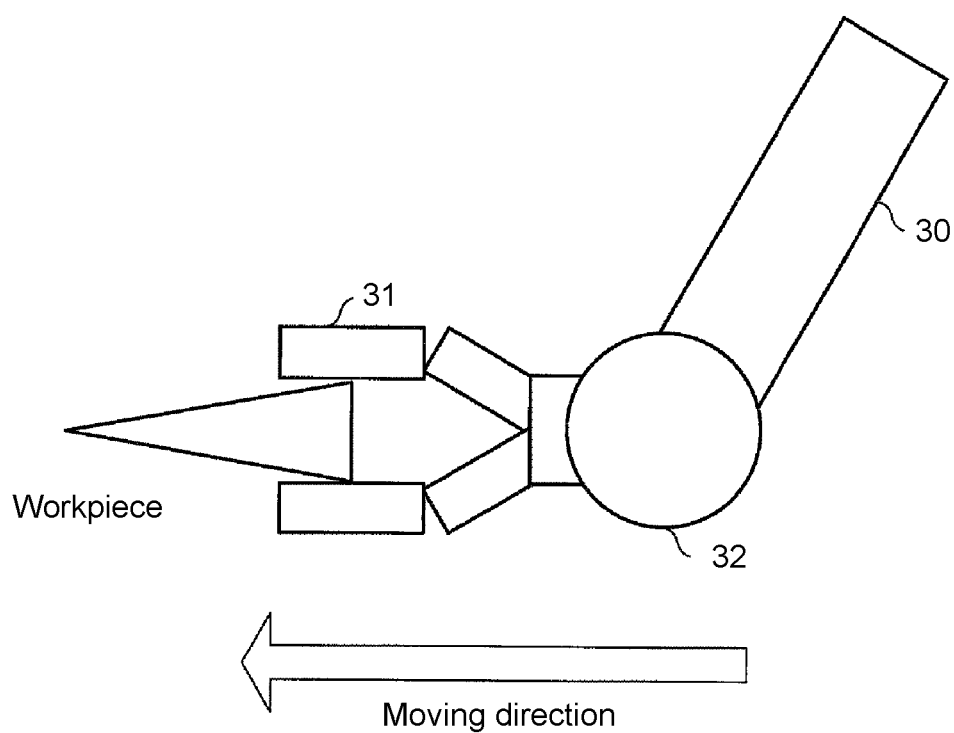
FIGS. 3A and 3B are schematic views illustrating a relation between a moving direction of a grip unit and an orientation of a hazardous part in the robot system according to the first embodiment of the invention.
Figure 3B:
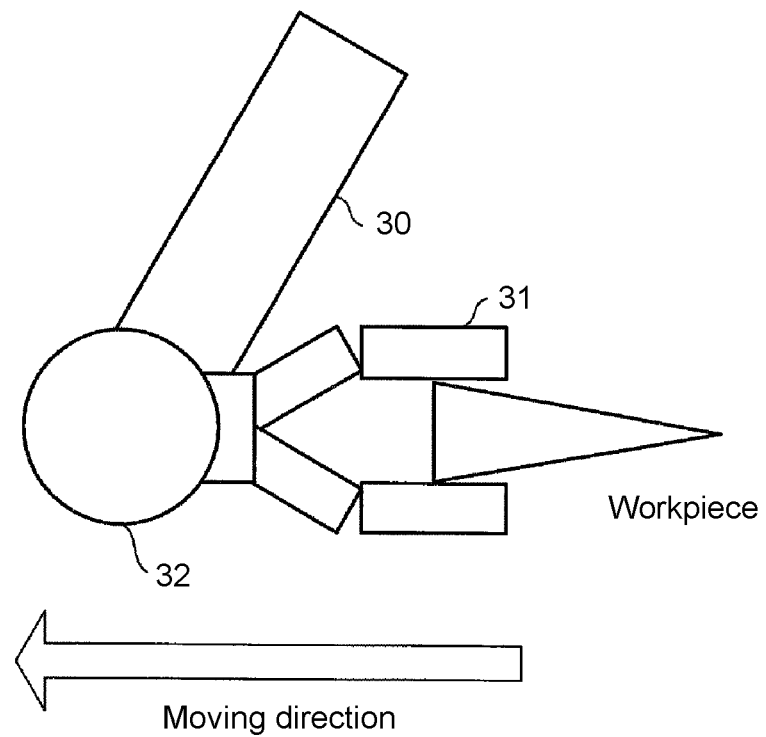

A relation between the moving direction of the grip unit 31 and the orientation of the hazardous part in the robot system 1 according to the embodiment will be described with reference to FIGS. 3A and 3B. FIGS. 3A and 3B are schematic views illustrating the relation between the moving direction of the grip unit 31 and the orientation of the hazardous part in the robot system 1. FIG. 3A illustrates a case in which the workpiece gripped with the grip unit 31 has a hazardous part and the hazardous part is oriented in the same direction as the moving direction of the grip unit 31. FIG. 3B illustrates a case in which the workpiece gripped with the grip unit 31 has a hazardous part and the hazardous part is oriented in a different direction from the moving direction of the grip unit 31.

In FIG. 3A, the arm 30 retains the workpiece by using the grip unit 31. In addition, the workpiece has a protrusion as a hazardous part, and the tip end of the protrusion is directed in the same direction as the moving direction of the grip unit 31. That is, if the grip unit 31 is caused to operate while keeping the state as illustrated in the drawing, the arm 30 operates in a manner of the protrusion of the workpiece would pierce in the moving direction of the grip unit 31. At this time, there is a concern that the operator may be stabbed (pierced) and injured by the protrusion of the workpiece if the operator is in the moving direction of the grip unit 31, for example.

Meanwhile, FIG. 3B illustrates the arm 30 in a case in which the hazardous part of the workpiece is oriented in the orientation opposite to the moving direction of the grip unit 31. At this time, the operator is not stabbed and injured by the protrusion of the workpiece even in a case in which the operator is in the moving direction of the grip 3, for example.

Therefore, the control unit 40 can determine, from the hazardous part information received from the information input unit 41 and the moving direction of the grip unit 31, which one of combinations in FIG. 3A and FIG. 3B is the combination between the moving direction of the grip unit 31 and the orientation of the hazardous part of the workpiece.

Furthermore, while the configuration in which the grip unit 31 does not have a protrusion and only the workpiece has the hazardous part has been described in the example illustrated in the drawing, the grip unit 31 may be configured to have a hazardous part.

Flow of Processing

Figure 4:
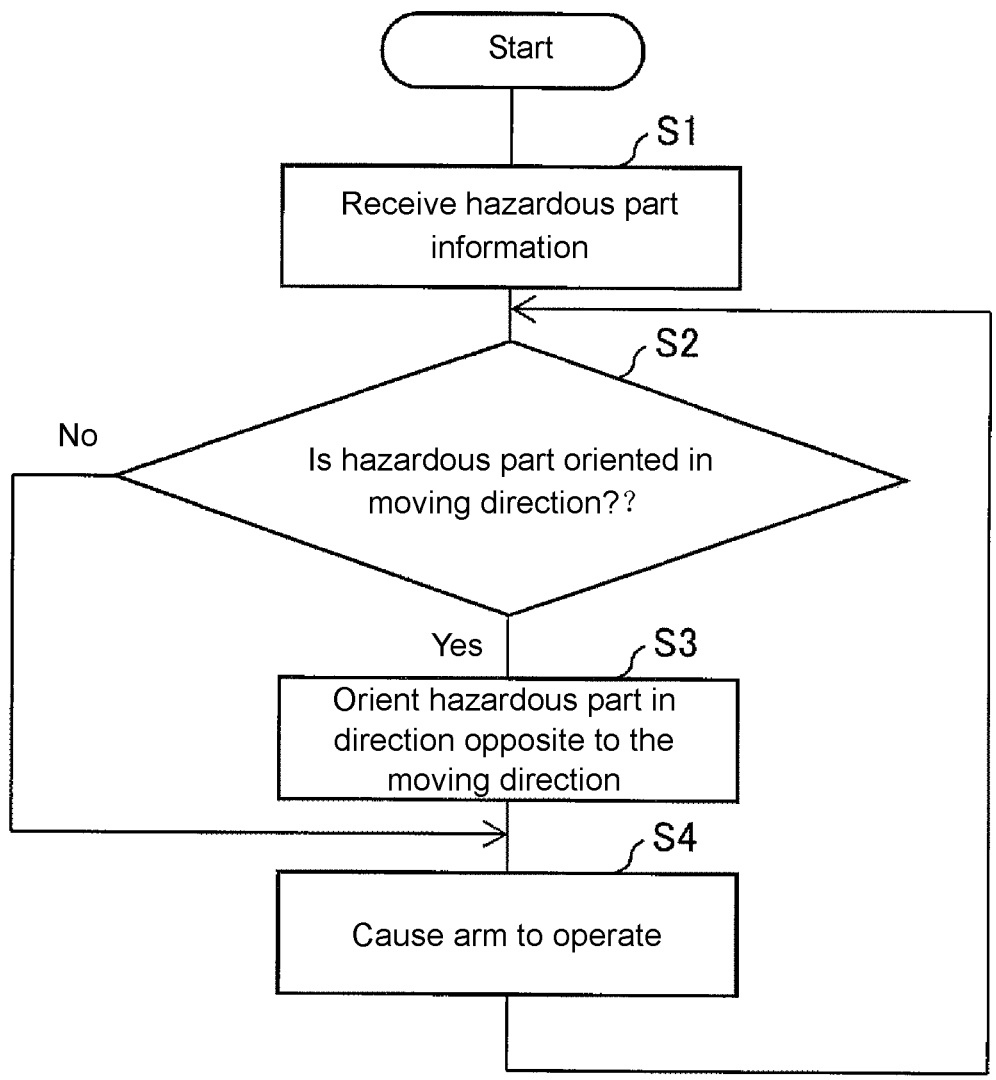
FIG. 4 is a flowchart illustrating an example of processing that the robot system according to the first embodiment of the invention executes.

A flow of processing that is executed by the robot system 1 according to the embodiment will be described with reference to FIG. 4. FIG. 4 is a flowchart illustrating an example of a flow of processing that is executed by the robot system 1.

First, the information input unit 41 receives hazardous part information input from the user via the input device 13 and stores the hazardous part information in the hazardous part information 22 in the storage unit 20 (S1). Next, the control unit 40 determines whether the hazardous part is currently oriented in the moving direction of the grip unit 31 from the information stored in the hazardous part information 22 in S1 (S2). In a case in which it is determined that the hazardous part is oriented in the moving direction of the grip unit 31 (YES in S2), the arm operation control unit 42 orients the hazardous part in the direction opposite to the moving direction of the grip unit 31 (S3) and then causes the grip unit 31 to operate in the moving direction (S4). Meanwhile, in a case in which it is determined that the hazardous part is not oriented in the moving direction of the grip unit 31 in S2 (NO in S2), the processing proceeds to S4, and the arm operation control unit 42 causes the arm 30 to operate (in the moving direction) without changing the orientation of the hazardous part. If the arm 30 is caused to operate in S4, then the robot system 1 waits for the next reception of an instruction for causing the arm 30 to operate. If the instruction for causing the arm 30 to operate is received, the processing in S2 to S4 is repeated.

By the aforementioned processing, the robot system 1 can cause the arm 30 to operate while the hazardous direction of the hazardous part is oriented in a direction different from the moving direction of the grip unit 31 when at least one of the grip unit 31 and the work target has the hazardous part. In this manner, it is possible to suppress injury to an operator due to collision of the hazardous part with the operator when the operator is in the operation direction of the arm 30, for example. Therefore, the effect that it is possible to provide a highly safe robot system is achieved.

Switching of Hazardous Parts

Figure 5A:
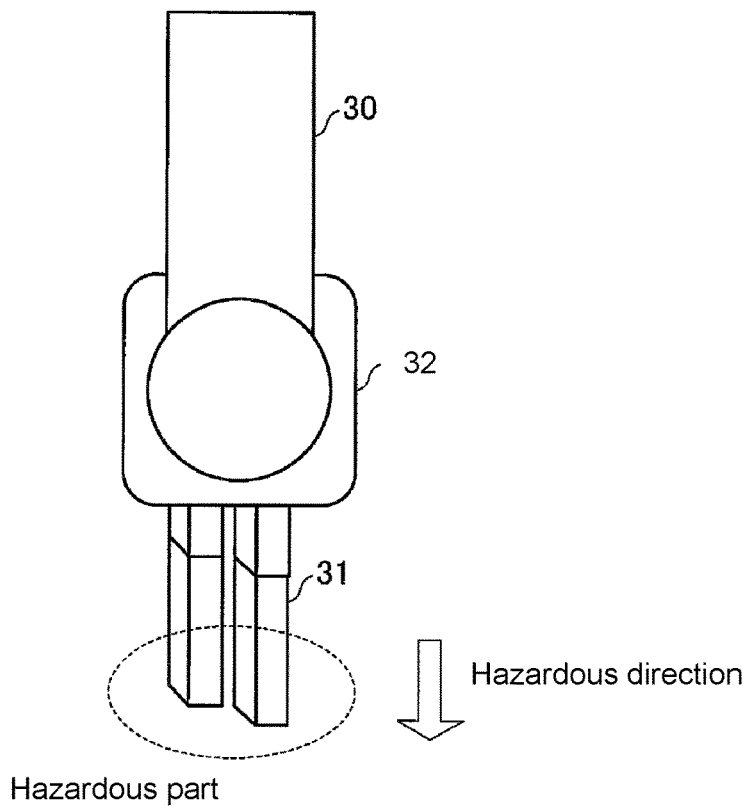
Figure 5B:
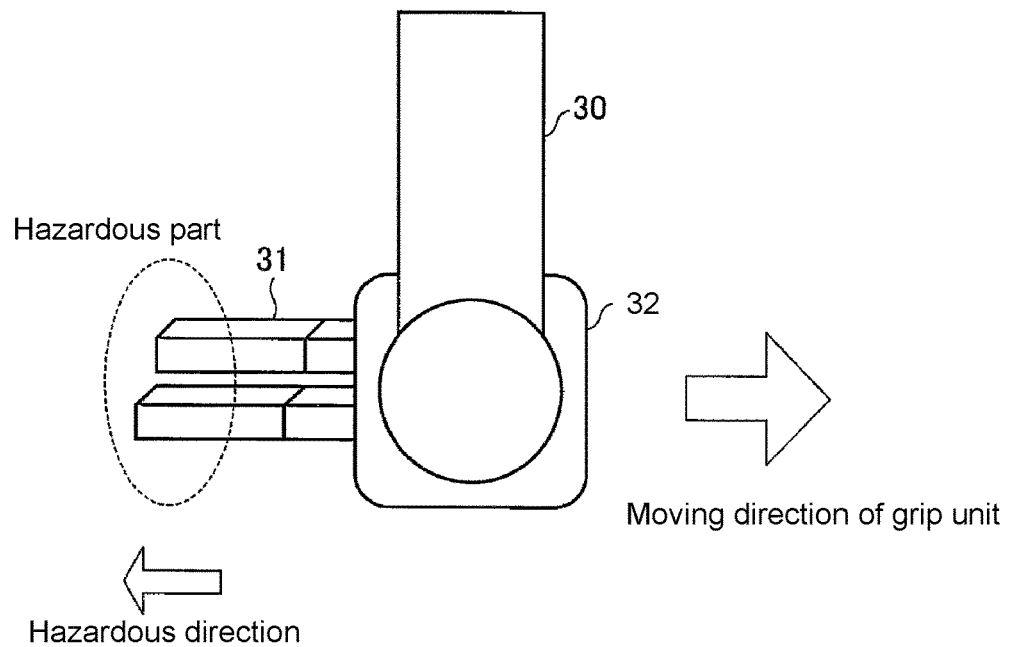
Figure 6A:
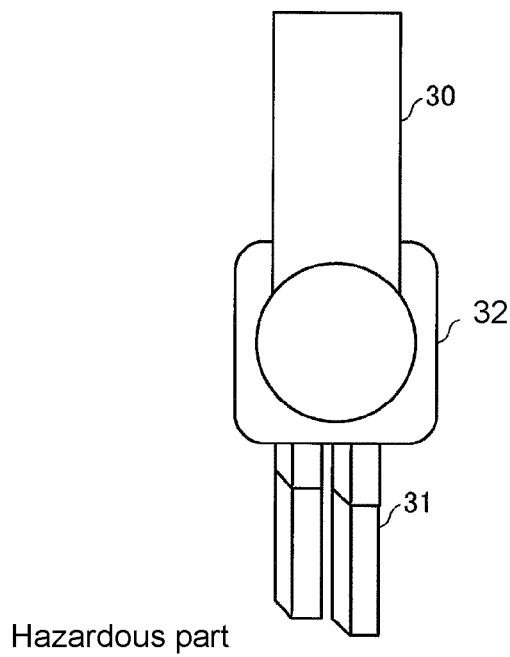
Figure 6B:
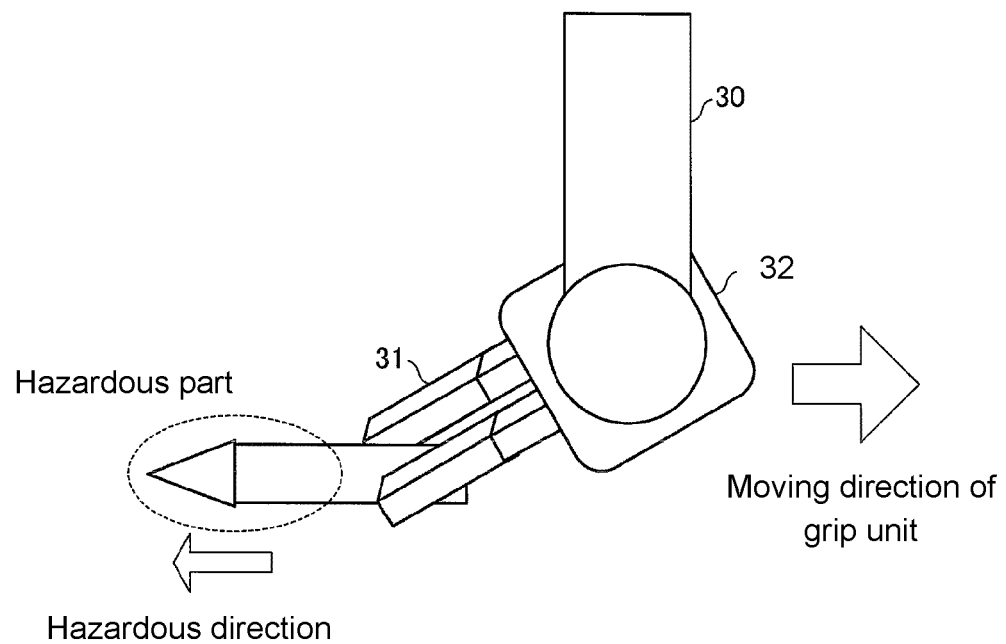

The relation between the moving direction of the grip unit 31 and the orientation of the hazardous part when the workpiece has the hazardous part has been described with reference to FIGS. 3A and 3B. However, the hazardous part can also be set at the grip unit 31. When the user sets hazardous parts at both the grip unit 31 and the workpiece by using the input device 13, for example, it is necessary for the robot system 1 to appropriately switch the hazardous parts in accordance with a state of the robot system 1 itself. The switching of the hazardous parts will be described with reference to FIGS. 5A-5B and 6A-6B. FIGS. 5A and 5B are schematic views illustrating a relation between a moving direction of the grip unit 31 and an orientation of a hazardous part in a case in which the hazardous part is set at the grip unit 31, in the robot system 1. FIG. 5A illustrates a state before the arm 30 is caused to operate, and FIG. 5B illustrates a state when the arm 30 is caused to operate. FIGS. 6A and 6B are schematic views illustrating a relation between a moving direction of the grip unit 31 and an orientation of a hazardous part in a case in which the hazardous part is set at the workpiece, in the robot system 1. FIG. 6A illustrates a state before the arm 30 is caused to operate, and FIG. 6B illustrates a state in which the arm 30 grips the workpiece by using the grip unit 31 and is operating.

FIG. 5A illustrates a state in which the arm 30 is not operating and the grip unit 31 that has the hazardous part has the hazardous part oriented to the lower side in the vertical direction. In the example illustrated in the drawing, the tip end portion surrounded by the circle mark in the grip unit 31 is a tip end of a protrusion and is a hazardous part for which there is concern that the operator may be stabbed and injured at the time of collision. Since the arm 30 is not operating in the state in FIG. 5A, the possibility that the user may be stabbed and injured by the protrusion is low.

FIG. 5B illustrates a state in which the grip unit 31 is operating in the moving direction. In the example illustrated in the drawing, the hazardous part that the grip unit 31 has is controlled by the arm operation control unit 42 to be oriented in the direction opposite to the moving direction of the grip unit 31. That is, the hazardous part surrounded by the circle mark in the grip unit 31 is oriented in the direction opposite to the moving direction of the grip unit 31, and the entire arm 30 operates in the direction opposite to the direction represented by the arrow in the drawing as the "Moving direction of grip unit". Since the protrusion is not pressed in the "Hazardous direction", it is possible to provide a highly safe robot system with a suppressed possibility of the operator being injured by the hazardous part that the grip unit 31 has.

FIG. 6A illustrates a state in which a bar-shaped workpiece that has a protrusion at one end is present in addition to the state in FIG. 5A. In the example illustrated in the drawing, the part surrounded by the circle including the protrusion is a hazardous part of the workpiece for which there is concern that the operator may be stabbed and injured at the time of collision. Furthermore, the direction represented by the arrow in the drawing as the "Hazardous direction" is a direction in which the operator may be stabbed and injured by the protrusion of the workpiece, and if the protrusion is pressed in the "Hazardous direction," the operator may be stabbed and injured. Since the workpiece is not moving in the state in FIG. 6A, the possibility of the user being stabbed and injured by the protrusion is low.

FIG. 6B illustrates a state when the grip unit 31 grips the workpiece and operates in the moving direction of the grip unit 31. Since the hazardous part of the workpiece is set in a region including the protrusion in the example illustrated in the drawing, the arm operation control unit 42 grips the workpiece in a manner of that the "Hazardous direction" corresponding to the orientation of the hazardous part is oriented in the direction opposite to the moving direction of the grip unit 31. Since the entire arm 30 operates in the direction opposite to the "Moving direction of grip unit" in this manner, the protrusion of the workpiece is not pressed in the "Hazardous direction." Therefore, it is possible to provide a highly safe robot system that suppresses stabbing and injury of the operator by the protrusion that the workpiece has.

In FIGS. 5A-5B and 6A-6B, the arm operation control unit 42 can switch the hazardous parts in accordance with information related to a position of a hazardous part and a hazardous direction of at least one of the grip unit 31 and the workpiece, which is stored in the hazardous part information 22. That is, when the grip unit 31 has the hazardous part and does not hold a workpiece or holds a workpiece with no hazardous part, the arm operation control unit 42 can cause the arm to operate such that the hazardous direction of the hazardous part of the grip unit 31 is different from the moving direction of the grip unit 31. Meanwhile, when the workpiece has a hazardous part and the grip unit 31 grips the workpiece, the arm operation control unit 42 can cause the arm to operate such that the hazardous direction of the hazardous part of the workpiece is different from the moving direction of the grip unit 31.

Alleviation of Collision by Operation Direction Leading Unit

The arm 30 may be configured to further include the operation direction leading unit 32. The operation direction leading unit 32 is provided (disposed) at a predetermined location of the arm 30 and can move in the moving direction prior to the grip unit 31 and the workpiece gripped with the grip unit 31 when the entire arm 30 operates in the moving direction of the grip unit 31. Although the operation direction leading unit 32 may have any configuration, the operation direction leading unit 32 may have a shape that is partially rounded with a low possibility that the operation direction leading unit 32 injures the operator even if the operation direction leading unit 32 collides against the operator, for example. Although the operation direction leading unit 32 may be provided at any location of the arm 30, the operation direction leading unit 32 may be provided at a position at which the operation direction leading unit 32 is automatically oriented in the operation direction if the hazardous part is oriented in a direction different from the moving direction of the grip unit 31 when at least any of the grip unit 31 and the workpiece has the hazardous part. The operation direction leading unit 32 may have a rounded shape that is provided at a boundary between the arm 30 and the grip unit 31 and is represented by a circular shape or a curved line in each of FIGS. 3A-3B, 5A-5B, and 6A-6B, for example. At this time, the arm operation control unit 42 can cause the arm 30 to operate in the manner that the hazardous part is oriented in a direction different from the moving direction of the grip unit 31 and the rounded shape is oriented in the operation direction on the basis of information acquired from the hazardous part information 22 when the hazardous part is set in at least any of the grip unit 31 and the workpiece.

Second Embodiment

Figure 7:
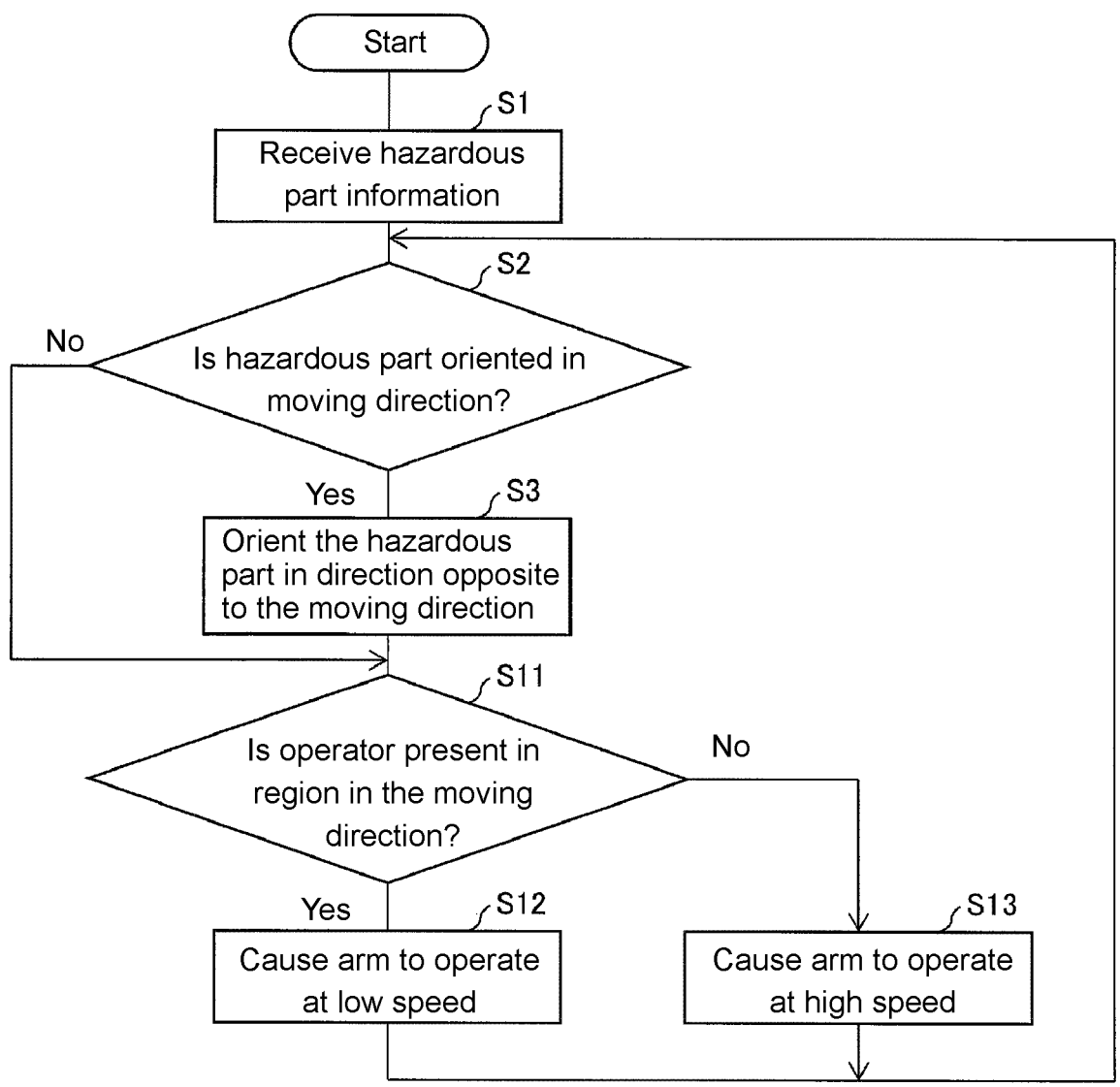
FIG. 7 is a flowchart illustrating an example of processing that a robot system according to a second embodiment of the invention executes.

A second embodiment of the invention will be described below with reference to FIGS. 1 and 7. Furthermore, the same reference numerals will be given to members that have the same functions as those of the members described in the aforementioned embodiment for convenience of description, and description thereof will be omitted.

Configuration of Robot System

A configuration of a robot system 1 according to the embodiment will be described with reference to FIG. 1.

Although the basic configuration of the robot system 1 is the same as that in the aforementioned first embodiment, a partial configuration of the arm operation control unit 42 is different.

Although the basic configuration of the arm operation control unit 42 is the same as that in the aforementioned first embodiment, the arm operation control unit 42 is different in that a moving speed of the grip unit 31 is caused to change in accordance with a position of an operation detected by the position detection unit 43. More specifically, the arm operation control unit 42 can cause the arm 30 to operate at a low speed when the position of the operator detected by the position detection unit 43 is within a moving direction region set in accordance with the moving direction of the grip unit 31. Further, after the arm 30 is caused to operate at the low speed, the arm operation control unit 42 can cause the arm 30 to operate at an ordinary speed that is higher than the low-speed operation in the operation direction when the position detection unit 43 does not detect the operator in the moving direction region. Here, the moving direction region is a predetermined region set in the moving direction of the grip unit 31. The moving direction region is a region set with respect to the direction in which the arm 30 operates, for example, and is a predetermined region that is regarded as having a possibility that the operator may collide against the arm 30 if the operator is present in the moving direction region.

Flow of Processing

A flow of processing that is executed by the robot system 1 according to the embodiment will be described with reference to FIG. 7. FIG. 7 is a flowchart illustrating an example of a flow of processing that is executed by the robot system 1.

Processing in S1 to S3 is the same as that in the aforementioned first embodiment. In a case in which it is determined that the hazardous part is not oriented in the moving direction in S2 (NO in S2), or after S3, the arm operation control unit 42 determines whether or not an operator is present in the moving direction region set in accordance with the moving direction of the grip unit 31 from the detection result obtained by the position detection unit 43 (S11). In a case in which it is determined that the operator is present (YES in S11), the arm operation control unit 42 causes the arm 30 to operate at a low speed (S12). If the arm 30 is caused to operate at the low speed in the operation direction in S12, the robot system 1 waits for the next reception of an instruction for causing the arm 30 to operate. If the instruction for causing the arm 30 to operate is received, the processing in and after S2 is repeated.

Meanwhile, in a case in which it is determined that no operator is present in the moving direction region in S11 (NO in S11), the arm operation control unit 42 causes the arm 30 to operate at a high speed (S13). If the arm 30 is caused to operate at the high speed in the operation direction in S13, the robot system 1 waits for the next reception of the instruction for causing the arm 30 to operate. If the instruction for causing the arm 30 to operate is received, the processing in and after S2 is repeated.

By the aforementioned processing, the robot system 1 can orient the hazardous part in a direction different from the moving direction of the grip unit 31, and further, when the operator is present in the moving direction region set in accordance with the moving direction of the grip unit 31, the robot system 1 can cause the entire arm 30 to operate at the low speed. Further, if the robot system 1 detects that the operator has stepped away from the moving direction region, the arm 30 can be caused to operate at the ordinary speed. In this manner, it is possible to suppress collision of the arm 30 against the operator and to suppress impact at the time of the collision. Therefore, the effect that it is possible to provide a further highly safe robot system is achieved.

Furthermore, the aforementioned configuration is a configuration in which the arm operation control unit 42 causes the arm 30 to operate at the low speed when the position detection unit 43 detects the operator in the moving direction region. However, a configuration in which the arm operation control unit 42 stops the operations of the arm 30 when the operator is detected in the moving direction region, for example, may be employed as long as it is possible to suppress collision of the arm 30 against the operator. At this time, the arm operation control unit 42 may be configured to restart the operations of the arm 30 if the position detection unit 43 does not detect the operator in the moving direction region.

Modification Example

The orientation in which the grip unit 31 grips the workpiece is not particularly limited in the configuration in the aforementioned respective embodiments. However, the arm operation control unit 42 may cause the arm 30 to operate while both a hazardous part of the grip unit and a hazardous part of the workpiece are oriented in a direction different from the moving direction of the grip unit 31 when both the grip unit 31 and the workpiece have the hazardous parts. That is, the arm operation control unit 42 may set both hazardous directions to directions different from the moving direction of the grip unit 31 when the hazardous direction of the hazardous part of the grip unit 31 and the hazardous direction of the hazardous part of the workpiece are different directions.

Although the hazardous part information is set for one type of workpiece and the hazardous direction of the hazardous part is oriented in a direction different from the moving direction of the grip unit 31 in the configuration in the aforementioned respective embodiments, a configuration in which the hazardous part information is set for a plurality of types of workpieces may be employed. At this time, the robot system 1 may be configured to specify the types of the workpieces first and orient the hazardous directions of the hazardous parts in directions different from the moving direction of the grip unit 31 on the basis of thee hazardous part information in accordance with the specified types.

In addition, the arm operation control unit 42 may switch the hazardous directions of the hazardous parts in accordance with an angle at which the grip unit 31 is gripping the workpiece in addition to the hazardous part information. At this time, the angle at which the grip unit 31 is gripping the workpiece may be set in advance in accordance with a mounting position and a mounting state of the workpiece at the time of a start of the operation of gripping the workpiece with the grip unit 31. In addition, the angle may be recognized by a workpiece gripping angle detection unit such as an image sensor.

CONCLUSION

A robot system (1) according to a first aspect of the invention includes: an arm operation control unit (42) that controls operations of an arm (30); and a storage unit (20) that records hazardous part information (22) related to a position of a hazardous part and a hazardous direction of at least any one of a grip unit (31) of the arm and a work target gripped with the grip unit, in which the arm operation control unit causes the arm to operate such that the hazardous direction of the hazardous part is different from a moving direction of the grip unit on the basis of the hazardous part information.

With the aforementioned configuration, the robot system can cause the arm to operate while the hazardous direction of the hazardous part is oriented in a direction different from the moving direction of the grip unit when at least any of the grip unit and the work target has the hazardous part. In this manner, it is possible to suppress stabbing and injuring the operator due to collision of the hazardous part against the operator when the operator is present in the moving direction of the grip unit, for example. Therefore, the effect that it is possible to provide a highly safe robot system is achieved.

The robot system (1) according to a second aspect of the invention may further include: an information input unit (41) that receives the hazardous part information (22), in the first aspect.

With the aforementioned configuration, it is possible to cause the robot system to perform the aforementioned hazard avoidance operation by the user inputting the hazardous part information to the information input unit, for example. That is, it is possible to update the hazardous part information in accordance with a change or the like in the work target, for example.

In the robot system (1) according to a third aspect of the invention, the arm operation control unit (42) may switch the hazardous direction of the hazardous part between a state in which the grip unit (31) is gripping the work target and a state in which the grip unit (31) is not gripping the work target, in the first or second aspect.

With the aforementioned configuration, the robot system can cause the arm to operate while the hazardous direction of the hazardous part is oriented in a direction different from the moving direction of the grip unit on the basis of the recorded hazardous part information of any of the grip unit and the work target in accordance with whether or not the grip unit is gripping the work target. In this manner, it is possible to cause the arm to operate while the hazardous direction of the hazardous part that the grip unit has is oriented in a direction different from the moving direction of the grip unit when the grip unit and the work target have hazardous parts and the grip unit does not grip the work target, for example. Meanwhile, when the grip unit grips the work target, it is possible to cause the arm to operate while the hazardous direction of the hazardous part is oriented in a direction different from the moving direction of the grip unit, for the hazardous part that the work target has.

In the robot system (1) according to a fourth aspect of the invention, the arm operation control unit (42) may switch the hazardous direction of the hazardous part in accordance with a type of the work target that the grip unit (31) is gripping, in any of the first to third aspects.

With the aforementioned configuration, the robot system can switch the hazardous direction of the hazardous part in accordance with the type of the work target. Accordingly, it is possible to cause the robot system to perform the aforementioned hazard avoidance operation in accordance with the types of the respective work targets in a case in which the robot system operates while switching and gripping a plurality of types of work targets in accordance with a situation, for example.

In the robot system (1) according to a fifth aspect of the invention, an operation direction leading unit (32) may be provided at a predetermined location of the arm (30), and the arm operation control unit (42) may cause the arm to operate such that the operation direction leading unit leads and the grip unit follows the operation direction leading unit in the moving direction of the grip unit (31), in any of the first to fourth aspects.

With the aforementioned configuration, the robot system can cause the arm to operate such that the operation direction leading unit leads the grip unit in the moving direction of the grip unit. In this manner, it is possible to suppress traumatic injury of the operator even of the operation direction leading unit collides against the operator, by providing a rounded shape to the operation direction leading unit or forming the operation direction leading unit by a flexible material, for example. Therefore, the effect that it is possible to provide a further highly safe robot system is achieved.

The robot system (1) according to a sixth aspect of the invention may further include a position detection unit (43) that detects a position of an operator near the robot system, the arm operation control unit (42) may stop operations of the arm (30) or causes the arm (30) to operate at a low speed when the position of the operator detected by the position detection unit is within a moving direction region set in accordance with the moving direction of the grip unit (31), in any of the first to fifth aspect.

With the aforementioned configuration, the robot system can stop the operations of the arm or cause the arm to operate at a low speed when the operator is present in the moving direction region. In this manner, it is possible to suppress collision of the arm against the operator and to suppress impact at the time of the collision. Therefore, the effect that it is possible to provide a further highly safe robot system is achieved.

In the robot system (1) according to a seventh aspect of the invention, the arm operation control unit (42) may restart the operations of the arm and cause the arm to operate at an ordinary speed in a case in which the position detection unit (43) does not detect the operator in the moving direction region after the operations of the arm (30) are stopped or the arm (30) is caused to operate at the low speed, in the sixth aspect.

According to the aforementioned configuration, the robot system can restart the operations of the arm or cause the arm to operate at the ordinary speed if the fact that the operator has stepped away from the moving direction region is detected. In this manner, the effect that it is possible to provide a robot system with enhanced safety and enhanced operation efficiency by further continuing the operations is achieved.

Example of Implementation by Software

Control blocks (the information input unit 41 and the arm operation control unit 42, in particular) in the robot system 1 may be implemented by a logic circuit (hardware) formed on an integrated circuit (IC chip) or the like or may be realized by software by using a central processing unit (CPU).

In the latter case, the robot system 1 includes a CPU that execute orders of a program that is software for implementing the respective functions, a read only memory (ROM) or a storage device (these will be referred to as a "recording medium") in which the aforementioned program and various kinds of data are recorded in a computer (or a CPU) readable manner, a random access memory (RAM) that develops the aforementioned program, and the like. Then, the object of one or some embodiments of the invention is achieved by a computer (or the CPU) reading the aforementioned program from the aforementioned recording medium and executing the program. As the aforementioned recording medium, a "non-transitory tangible medium" such as a tape, a disc, a card, a semiconductor memory, or a programmable logic circuit, for example can be used. In addition, the aforementioned program may be supplied to the aforementioned computer via an arbitrary transmission medium (a communication network, a broadcasting wave, or the like) capable of transmitting the program. Furthermore, an aspect of the invention can also be implemented in a form of data signals, in which the aforementioned program is realized by electronic transmission, which are incorporated in carrier waves.

The invention is not limited to the aforementioned respective embodiments, various modifications can be made within the scope indicated by the claims, and an embodiment obtained by appropriately combining technical means respectively disclosed in different embodiments is also included within the technical scope of the invention.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A robot system comprising:
an arm operation control unit that controls operations of an arm; and
a storage unit that records hazardous part information related to a first position of a first hazardous part and a first hazardous direction of a grip unit of the arm and a second position of a second hazardous part and a second hazardous direction of a work target gripped by the grip unit, wherein the first hazardous part comprises a first protrusion having a first tip and the first hazardous direction is a direction to which the first tip of the first protrusion faces to,
wherein in response to determining that the first hazardous part of the grip unit is oriented to have the first hazardous direction that faces a moving direction of the grip unit, the arm operation control unit causes the arm to operate in a manner that the first hazardous direction of the first hazardous part is different from the moving direction of the grip unit on the basis of the hazardous part information.

2. The robot system according to claim 1, further comprising:
an information input unit that receives the hazardous part information.

3. The robot system according to claim 1, wherein
the second hazardous part comprises a second protrusion having a second tip and the second hazardous direction is a direction to which the second tip of the second protrusion faces to, and
in response to determining that the second hazardous part of the work target is oriented to have the second hazardous direction that faces the moving direction of the grip unit, the arm operation control unit causes the arm to operate in a manner that the second hazardous direction of the second hazardous part of the work target is different from the moving direction of the grip unit on the basis of the hazardous part information.

4. The robot system according to claim 1, wherein
the hazardous part information comprises the second position of the second hazardous part and the second hazardous direction corresponding to a plurality of types of the work target,
the arm operation control unit causes the arm to operate in a manner that the the second hazardous direction of the second hazardous part is different from the moving direction of the grip unit on the basis of the hazardous part information in corresponding to a type among the plurality of types of the work target that the grip unit is gripping.

5. The robot system according to claim 1,
wherein an operation direction leading unit is provided at a predetermined location of the arm, and
the arm operation control unit causes the arm to operate in a manner of the operation direction leading unit leads and the grip unit follows the operation direction leading unit in the moving direction of the grip unit.

6. The robot system according to claim 1, further comprising:
a position detection unit that detects a position of an operator near the robot system,
wherein the arm operation control unit stops operations of the arm or causes the arm to operate at a low speed when the position of the operator detected by the position detection unit is within a moving direction region set in accordance with the moving direction of the grip unit.

7. The robot system according to claim 6, wherein after the operations of the arm are stopped or the arm is caused to operate at the low speed, the arm operation control unit restarts the operations of the arm or causes the arm to operate at an ordinary speed when the position detection unit does not detect the operator in the moving direction region.

8. The robot system according to claim 2, wherein
the hazardous part information comprises the second position of the second hazardous part and the second hazardous direction corresponding to a plurality of types of the work target,
the arm operation control unit causes the arm to operate in a manner that the the second hazardous direction of the second hazardous part is different from the moving direction of the grip unit on the basis of the hazardous part information corresponding to a type among the plurality of types of the work target that the grip unit is gripping.

9. The robot system according to claim 3, wherein
the hazardous part information comprises the second position of the second hazardous part and the second hazardous direction corresponding to a plurality of types of the work target,
the arm operation control unit causes the arm to operate in a manner that the the second hazardous direction of the second hazardous part is different from the moving direction of the grip unit on the basis of the hazardous part information corresponding to a type among the plurality of types of the work target that the grip unit is gripping.

10. The robot system according to claim 2,
wherein an operation direction leading unit is provided at a predetermined location of the arm, and
the arm operation control unit causes the arm to operate in a manner of the operation direction leading unit leads and the grip unit follows the operation direction leading unit in the moving direction of the grip unit.

11. The robot system according to claim 3,
wherein an operation direction leading unit is provided at a predetermined location of the arm, and
the arm operation control unit causes the arm to operate in a manner of the operation direction leading unit leads and the grip unit follows the operation direction leading unit in the moving direction of the grip unit.

12. The robot system according to claim 4,
wherein an operation direction leading unit is provided at a predetermined location of the arm, and
the arm operation control unit causes the arm to operate in a manner of the operation direction leading unit leads and the grip unit follows the operation direction leading unit in the moving direction of the grip unit.

13. The robot system according to claim 2, further comprising:
   a position detection unit that detects a position of an operator near the robot system,
   wherein the arm operation control unit stops operations of the arm or causes the arm to operate at a low speed when the position of the operator detected by the position detection unit is within a moving direction region set in accordance with the moving direction of the grip unit.

14. The robot system according to claim 3, further comprising:
   a position detection unit that detects a position of an operator near the robot system,
   wherein the arm operation control unit stops operations of the arm or causes the arm to operate at a low speed when the position of the operator detected by the position detection unit is within a moving direction region set in accordance with the moving direction of the grip unit.

15. The robot system according to claim 4, further comprising:
   a position detection unit that detects a position of an operator near the robot system,
   wherein the arm operation control unit stops operations of the arm or causes the arm to operate at a low speed when the position of the operator detected by the position detection unit is within a moving direction region set in accordance with the moving direction of the grip unit.

16. The robot system according to claim 5, further comprising:
   a position detection unit that detects a position of an operator near the robot system,
   wherein the arm operation control unit stops operations of the arm or causes the arm to operate at a low speed when the position of the operator detected by the position detection unit is within a moving direction region set in accordance with the moving direction of the grip unit.

* * * * *